United States Patent [19]

Aharoni et al.

[11] 4,390,667

[45] Jun. 28, 1983

[54] PROCESS FOR INCREASING THE MELT VISCOSITY OF POLYAMIDE WITH ARYL PHOSPHATE COMPOUND

[75] Inventors: Shaul M. Aharoni, Morris Plains; Theodore Largman, Morristown, both of N.J.

[73] Assignee: Allied Corporation, Morris Township, Morris County, N.J.

[21] Appl. No.: 280,564

[22] Filed: Jul. 6, 1981

[51] Int. Cl.$^3$ ............................ C08G 9/48; C08G 9/46
[52] U.S. Cl. .................................... 525/420; 524/140; 524/141; 524/142; 524/144; 525/419
[58] Field of Search ................................ 525/420, 419

[56] References Cited

U.S. PATENT DOCUMENTS

| | | | |
|---|---|---|---|
| 2,959,570 | 11/1960 | Kessler et al. | 525/2 |
| 3,345,341 | 10/1967 | Berry et al. | 525/2 |
| 3,437,641 | 4/1969 | Lenz et al. | 525/420 |
| 3,549,651 | 12/1970 | Oswald et al. | 525/2 |
| 3,551,548 | 12/1970 | Brignac et al. | 264/176 F |
| 3,631,001 | 12/1971 | Arakawa et al. | 525/2 |
| 3,763,113 | 10/1973 | Burrows et al. | 525/420 |
| 4,196,118 | 4/1980 | Fujie et al. | 525/2 |

FOREIGN PATENT DOCUMENTS 55-108453  8/1980  Japan.

*Primary Examiner*—Harold D. Anderson
*Attorney, Agent, or Firm*—Kenneth E. Stroup, Jr.; Alan M. Doernberg; Gerhard H. Fuchs

[57] ABSTRACT

A process for decreasing the melt index and increasing the viscosity of polyamide compositions by adding thereto an effective amount of an aryl phosphate compound, and thereafter heating the composition until the desired changes in melt index or viscosity are attained.

13 Claims, No Drawings

PROCESS FOR INCREASING THE MELT VISCOSITY OF POLYAMIDE WITH ARYL PHOSPHATE COMPOUND

BACKGROUND OF THE INVENTION

1. Field of the Invention

This invention relates to a process for increasing the melt index and viscosity of polyamide compositions. More particularly, this invention relates to such a process in which the increase in melt index and viscosity is effectuated by the addition of an effective amount of an aryl phosphate compound. Polyamide compositions treated in accordance with the process of this invention are capable of being fabricated into useful shaped articles of manufacture, e.g. filaments, both mono- and multifilament, films, tapes, ribbons, rods, laminates, etc.

2. Description of the Prior Art

Polyamide compositions are disclosed in the prior art as having many and varied uses in industrial and commercial applications. For example, these polymers can be formed in filaments in which the polymer chains are oriented along the filament axis. Such filaments have many uses, in commercial applications as for example in the production of fibers for tire cord, textiles and the like. Similarly, these polymers can be fabricated into other useful shaped articles, as for example, gears, lawn mower housings, skate boards and the like.

The melt index of polyamide compositions provides an indication of the viscosity of the polyamides, and their molecular weights. In general, polymers having low melt indexes are desirable because of improved properties of fibers and other shaped articles made therefrom. For example, fibers made from polymers of relatively low melt indexes have increased tensile strength, durability and impact resistance. These properties are very desirable, especially in fibers used as reinforcement for pneumatic automobile tires.

Several processes have been proposed in the prior art for increasing the viscosity and molecular weight of polyamides, as for example poly(hexamethyleneadipamide). One such method is set forth in U.S. Pat. No. 3,763,113 which discloses a method for increasing the molecular weight of polyamides having recurring —CONH-alkylene-NHCO-alkyleneunits, such as poly(hexamethyleneadipamide) by heating the polyamide with a phosphonic acid derivative in the presence of an inert gas, such as nitrogen. Similarly, U.S. Pat. Nos. 3,551,548 and 3,763,113, each broadly describes a method for increasing the relative viscosity of polyamides, generally, and poly(hexylmethylene adipamide), specifically, by sweeping a molten mixture of the polyamide and phosphorous compound with an inert gas.

Each of these processes provide various adverse effects. For example, in each of the processes an inert gas is employed, which in high concentrations cause uneven finishing, i.e. a variation in the degree of polymerization, throughout the polyamide, which results in a nonuniform polymer. Furthermore, inert gas is expensive, and require additional equipment and monitoring which can increase the cost of commercialization of the process, even though the inert gas is used in small amounts.

SUMMARY OF THE INVENTION

In accordance with this invention there is provided a process for increasing the melt index and viscosity of a polyamide which comprises:

A. forming a molten mixture of said polyamide and an effective amount of a aryl phosphate compound of the formula;

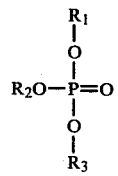

wherein
$R_1$ is a substituted phenyl group of the formula:

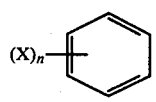

wherein
X is the same or different at each occurrence, and is select such that the sum of the Hammett sigma values ($\sigma$) for X substituents is greater than 0;
n is an integer from 1 to 5;
$R_2$ and $R_3$ are the same or different and are individually hydrogen or $R_1$; and B. Heating said mixture for a time and at a temperature such that the melt index said mixture is less than the melt index of said polyamide and viscosity of said composition is greater than the viscosity of said polyamide. As used herein, "an effective amount" is an amount of the phosphate compound which is effective to cause the decrease in melt index and the increase in viscosity. As used herein "melt index" denotes a particular combination of test conditions for measuring rate of extrusion of the polyamide through an orifice of a specified length and diameter. The equipment is called a melt indexer because it permits the indexing or classification of melted resins according to an agreed upon convention. The defice has been adopted and standardized as an ASTM Tentative Method of Measuring Flow Rates of Thermoplastics by Extrusion Plastometer (D 1238), ISO Recommendation and the Determination of the Index of Fluidity of Polyethylene Compounds (R317), British Standards BS 1972 and BS 2782 Method 105C, and Government Department Electrical Specification Number 27, 1950, Great Britain. Manufacturers of melt index equipment meeting the ASTM requirements are: Appalachian Electronids Inc., Ronceverte, W. Va.; F. F. Slocomb Corporation, Wilmington, Del.; Tinius Olson Testing Machine Company, Willow Grove, Pa.; and W. J. Hacker and Company, Inc., West Caldwell, N.J.

As used herein, "viscosity" denotes the internal friction, i.e. fluidity of the polyamide, and is well known in the art. A wide variety of viscometers is available for measurement of viscosity, such as capillary, rotational, orifice, falling ball, and oscillatory types. They are described in Barr, "A Monograph of Viscometry," Oxford, New York (1931) and Kirk and Othmer, "Encyclopedia of Chemical Technology," Vol. 14, pp.

756–775 the Interscience Encyclopedia, Inc., New York (1955).

DETAILED DESCRIPTION OF THE INVENTION

The process of this invention is conveniently carried out in two steps. The first step of the process consists of forming a molten mixture of an appropriate polyamide and a phosphate compound of the formula:

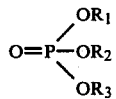

wherein $R_1$, $R_2$, $R_3$, X and n are as described hereinabove. In the second step of the process, the molten mixture is heated until the desired melt index and viscosity is attained. As used herein, "molten mixture" is a mixture which has been heated to a temperature which is equal to or greater than the melting point of the polyamide component of the mixture. The manner in which the molten mixture is formed is not critical and conventional methods can be employed. For example, the molten mixture can be prepared through use of conventional polyamide and additive blending means, in which the polyamide is heated to a temperature equal to or greater than its melting point. An effective amount of the phosphate compound in a granulated or powdered form is then added to the melted polyamide while vigorously stirring the melt. Heating is continued until the required decrease in melt index and increase in viscosity has been obtained.

Alternatively, the components of the composition can be granulated and the granulated components mixed dry in a suitable mixer, as for example a Branbury Mixer, or the like, as uniformly as possible. Thereafter, the composition is heated in an extruder until the polyamide is melted. As described above, the mixture is heated until the desired increase in the melt index and viscosity has been obtained, and it is thereafter expressed with cooling.

The order of mixing of the various components is not critical. Accordingly, the order of addition of the polyamide and phosphate components, or other optional components, to be described in more detail hereinbelow to form the mixture, can be varied as desired.

The process of this invention is preferably carried out in the absence of air, as for example in the presence of an inert gas, such as, argon, neon, nitrogen or the like. The process can be carried out in a batchwise or discontinuous fashion, as for example, carrying out the process in a sealed container. Alternatively, the process can be carried out in a continuous fashion in a single processing zone, as for example by use of an extruder as described hereinabove, or in a plurality of such reaction zones in series or parallel.

Reaction temperatures are not critical and can be varied widely as desired. However, it should be appreciated that the process temperature should be at least as high as the melting point of the particular polyamide employed, and below the degradation temperature of the polyamide. In the preferred embodiments of this invention, the process temperature is such that the polymer will remain in the molten state as its viscosity increases and melt index decreases during the conduct of the process. Normally this can be accomplished in one of two ways. Either the process can be carried out at a temperature which is equal to or greater than the melting point of the desired product; or process temperatures can be increased periodically over the course of the conduct of the process so as to maintain the molten mixture. In the particularly preferred embodiments of this invention employing particularly preferred polyamide compositions, and in which the melt index and viscosity of the polymer is increased the particularly preferred amount, the process temperature is at least about 190° C. Amongst these particularly preferred embodiments, most preferred process temperatures are in the range of from about 230° C. to about 295° C.

Similarly, process pressures are not critical and can be varied widely without adversely affecting the process. Consequently, the process can be conducted at sub-atmospheric, atmospheric or super-atmospheric pressures.

The process is carried out, for a time sufficient to decrease the melt index and increase the viscosity to the desired extend, and reaction times can be varied over a wide range. Usually reaction times will depend on a variety of factors such as melt index and viscosity of the polyamide, desired melt index and viscosity of the final product, reaction temperatures, phosphate component and its concentration, and other factors known to those of skill in the art to affect reaction times. When the process of this invention is employed to obtain maximum decreases in melt index and increase in viscosity, process times are critical. Experimentation has indicated that in the particularly preferred embodiments of this invention, melt indexes decrease to a minimum value and viscosities increase to a maximum value, and that continued subjection to the conditions of this invention results in an increase in melt index and a decrease in viscosity due to thermal degradation of the product. Ordinarily, the reaction time can vary from a few seconds to 24 hours or more. In the preferred embodiments of this invention reaction times will vary from about 1 min. to about 60 min., and in the particularly preferred embodiments from about 2 min. to about 30 min.

Best results are obtained when the process of this invention is carried out in the presence of as little water as possible. Ideally, the conditions will by anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

Phosphate compounds useful in the conduct of the process of this invention are those of the formula:

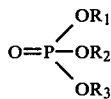

wherein $R_1$, $R_2$ and $R_3$ are as described herein above. Such compounds are those in which at least one of the $R_1$, $R_2$ or $R_3$ phenyl functions is substituted with substituents such that the sum of the Hammet sigma ($\sigma$) values of the substituents is greater than zero. Hammett sigma ($\sigma$) values are well known in the art and are described in detail in Hammett, *Physical Organic Chemistry*, McGraw-Hill Book Co., Inc., New York, 1940 pp. 184-199; and Jaffe, *Chem Revs.*, 53, 191 (1953). Modified Hammett relationships are described in detail in Price and Michel, *J. Am. Chem. Soc.* 74, 3652 (1952) and Elderfield and Siegel, ibid., 73, 5622 (1951). The "sigma ($\sigma$) value" for a substituent or substituents may be obtained most directly by measuring the effect of that substituent or those substituents on the ionization constant of benzoic acid in water at 25°, and is defined as:

Hammett Sigma Value ($\sigma$) = $\log \dfrac{K_{X_nC_6H_{5-n}COOH}}{K_{C_6H_5-COOH}}$ where X and n are as described hereinabove, and, where $KX_{nC_6H_5nCOOH}$ and $K_{C_6H_5-COOH}$ are the ionization constants for the substituted and unsubstituted benzoic acids, respectively. In the preferred embodiments of this invention, sum of the Hammett sigma ($\sigma$) values for all substituents is greater than about 0.10, and in the particularly preferred embodiments the sum is greater than about 0.20. Amongst these particularly preferred embodiments, those for which the sum of the substituent Hammett sigma values is greater than about 0.23 are most preferred. Illustrative of suitable "X" substituents that are within the scope of the preferred embodiments of this invention are trifluoromethyl; fluoro; chloro; bromo; iodo; nitro; cyano; alkylcarbonyl, as for example, methylcarbonyl; the quaternary ammonium radical; aldehyde and the like. Amongst these illustrative preferred embodiments, halo substituents such as chloro, bromo and iodo, are particularly preferred. In the preferred embodiments of this invention $R_1$, $R_2$ and $R_3$ are the same and n is 1, 2 or 3, and in the particularly preferred embodiments, $R_1$, $R_2$ and $R_3$ are the same; n is 1 or 2 and X is substituted in either the para and/or meta positions.

Phosphate compounds useful in the conduct of the process of this invention are known compounds which can be prepared in accordance with known procedures, or alternatively obtained from commercial sources. For example, useful phosphate compounds can be conveniently prepared by reacting the corresponding substituted phenol with phosphoryl chloride.

An effective amount of the substituted aryl phosphate compound is employed in forming the molten mixture. As used herein "an effective amount" is an amount of the aryl phosphate compound which when added to a polyamide in accordance with the invention forms a mixture having a viscosity which is greater than that and a melt index which is less than of the polyamide as measured prior to such addition. Normally, the greater the amount of the aryl phosphate compound employed, the greater the decrease in melt index and the increase in viscosity attained; and conversely, the less the amount of aryl phosphate compound employed, the less the decrease in melt index and the increase in viscosity attained. In the preferred embodiments of this invention, the quantity of aryl phosphate compound employed is at least about 0.05 weight percent, based on the total weight of the mixture. In the particularly preferred embodiments of this invention, the weight percent of aryl phosphate compound is in the range of from about 0.1 to about 10 weight percent, and amongst these particularly preferred embodiments, those in which the quantity of phosphate compound employed is from about 0.2 to about 2 weight percent based on the total weight of the mixture are most preferred.

Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCORCONHR$^1$— in which R is an alkylene group of at least two carbon atoms, preferably from 2 to 10; and $R^1$ is selected from R and phenyl groups. Also, included are copolyamides and terpolyamides obtained by known methods, for example, by condensation of hexamethylene diamine and a mixture of dibasic acids consisting of terephthalic acid and adipic acid. In addition to the above polyamides, the polyamides also include polyamides obtained from amino acids and derivatives thereof as for example lactams.

Polyamides of the above description are well-known in the art and include, for example, the copolyamide of 30% hexamethylene diammonium isophthalate and 70% hexamethylene diammonium adipate, polyhexamethylene adipamide (nylon 66), poly(butyrolactam) (nylon 4), poly(enantholactam) (nylon 7), poly(capryllactam) (nylon 8), polycaprolactam (nylon 6), polyhexamethylene sebacamide (nylon 610) and polyhexamethylene adipamide-containing polymers, such as polymers containing polyhexamethylene adipamide and polyhexamethylene isophthalamide, or polyhexamethylene terephthalamide or polycaproamide, or combinations thereof. The polyamide for use in the most preferred embodiments of this invention is polycaprolactam which is commercially available from Allied Corporation under the tradename Capron TM Nylon.

Various other optional ingredients, which are normally included in polyamide compositions, may be added to the mixture at an appropriate time during the conduct of the process. These optional ingredients can be added either prior to or after melting of the polyamide in the first step of the process of this invention; or after the conduct of the second step in which the melt index and viscosity changed the desired amount. Such optional components include fillers, plasticizers, impact modifiers, colorants, mold release agents, antioxidants, ultraviolet light stabilizers, lubricants, antistatic agents, fire retardants, and the like. These optional components are well known to those of skill in the art, accordingly, only the preferred optional components will be described herein in detail.

The molding composition of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, etc. such fillers are well known materials and are readily available. The foregoing recited fillers are illustrative only and are not meant to limit the scope of the fillers that can be employed in this invention. In the preferred embodiments of this invention fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polyamide component, and in the particularly preferred embodiment is in the range of from about 0.30 to about 90 weight percent on the same basis.

It is also very desirable to include a plasticizer of the type known in the art for use with polyamide composition. Useful plasticizers include caprolactam, mixtures of ortho and para toluene ethyl sulfonamides, and the like.

The process of this invention provides polyamide compositions having increased melt indexes and viscosities. Such polyamides are extremely useful as tire card in pneumatic tires. Because of the additional and unexpectedly large decrease in melt index and large increase in viscosity achieved by the process of this invention, the polyamide product and filaments, fibers and yarn produced therewith have significantly better properties than polyamides and products of polyamides that do not include a substituted aryl phosphate compound. For example, the fibers have increased tenacity, greater breaking strength and greater resistance to depolymerization. When yarn produced from a polyamide prepared by the process of this invention is made into tire cord and the cord is then used for pneumatic tire reinforcement, the life span of the tire is markedly increased over that of tires reinforced with cord made from polyamides that contained no aryl phosphate compound but were otherwise identically prepared. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipment, components for the electrical and electronics industries and electrical insulations, car components, circuits, fibers and semifinished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The compositions prepared according to the process of this invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films.

The following specific examples are presented to more particularly illustrate the invention, and should not be construed as being limitations on the scope and spirit of the invention.

EXAMPLES I TO IV

In these examples, various representative embodiments of this invention were carried out employing the following general mixing and extrusion procedures.

A. Mixing

The base substrate, nylon 6, was in the form of ⅛" pellets. After weighing in wide-mouth jars, the nylon samples were dried for 16 hours at 100°–110° C. in a vacuum oven. This drying step was done prior to blending, and the sample was kept in sealed jars during interim periods to maintain dryness.

Weighed amounts of the aryl phosphate additive were added to the nylon and the sealed jars were rotated on a rolling mill for 0.5 hr., this action effectively coated the surface of the pellets.

B. Extrusion

Melt blending was accomplished using a Wayne extruder with a mixing screw 1" diameter 25" long. Temperatures along the extruder are as follows: zone 1, 250° C.; zone 2, 225° C.; zone 3, 260° C.; and die, 260° C. Extrusion rates were controlled by a variable speed motor. The single strand extrudate proceeded from the die into a water bath whose level was maintained within inches of the die and whose water temperature was maintained at approximately 10° C. with ice. From the water bath the strand exited to a small Wayne pelletizer.

Pellets were vacuum dried and subjected to melt index (M.I.) determination on a dead weight piston plastometer, employing the procedures of ASTM D-1238, D-2116, D-3159 and D-3364. Reduced viscosity was at 23° C., 0.5% concentration of polymer in m-cresol. The percent composition of the resulting polymer compositions, based on the total weight, and their physical properties, i.e. relative viscosity ($\eta$) and formic acid viscosity (FAV) are set forth in TABLE I as follows:

TABLE 1

| Example | Weight % Aryl Phosphate Compound | % Nylon | n | FAV |
| --- | --- | --- | --- | --- |
| Control | 0 | 99 Nylon 8207[1] | 1.85 | 64 |
| I | 1.0% Tri-(p-chlorophenyl) phosphate | 99 Nylon 8207 | 2.32 | 205 |
| Control II | 0 | 99 LMW/Nylon 6[2] | 1.42 | 36 |
| II | 1.0% Tri-(p-chlorophenyl) phosphate | 99 LMW/Nylon 6 | 1.84 | 61 |
| Control III | 0 | 99 A- Nylon[3] | 1.73 | 53 |
| III | 1.0% Tri-(p-chlorophenyl) phosphate | 99 A- Nylon | 1.98 | 72 |
| Control IV | 0 | 99 B- Nylon[4] | 1.55 | 43 |
| IV | 1.0% Tri-(p-chlorophenyl) | 99 B- Nylon | 1.84 | 61 |

TABLE 1-continued

| Example | Weight % Aryl Phosphate Compound | % Nylon | n | FAV |
|---|---|---|---|---|
| | phosphate | | | |

[1]"Nylon 8207 ™" is a polycaprolactam produced by Allied Corporation having an equal number of amino and carboxyl end groups

[2]"LMW/Nylon 6" is a low molecular weight polycaprolactam having a molecular weight of about 24,000

[3]"A- Nylon ™" is a polycaprolactam having more carboxyl end groups than amino end groups

[4]"B- Nylon ™" is a polycaprolactam having more amino end groups than carboxyl end groups The foregoing detailed description of the invention has been given for clearness of understanding only, and no unnecessary limitations are to be understood therefrom. The invention is not limited to the exact details herein shown and described, and will encompass obvious modifications which will occur to those of skill in the art in light of the appended claims.

What is claimed is:

1. A process for decreasing the melt index and increasing the viscosity of a polyamide which comprises:

A. forming a molten mixture of said polyamide and an effective amount of an aryl phosphate compound of the formula:

$$\begin{array}{c} R_1 \\ | \\ O \\ | \\ R_2O-P=O \\ | \\ O \\ | \\ R_3 \end{array}$$

(a) wherein $R_1$ is a substituted phenyl group of the formula:

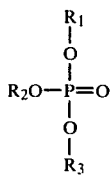

wherein:
   X is the same or different at each occurrence and is such that the Hammett sigma ($\sigma$) values of X substituents is greater than zero; and
   n is an integer which is equal to or greater than 1; and (b) $R_2$ and $R_3$ are the same or different and are individually hydrogen or $R_1$; and B. Heating said mixture for a time and at a temperature sufficient to decrease the melt index and increase the viscosity of said polyamide.

2. A process according to claim 1 wherein $R_1$, $R_2$ and $R_3$ are the same.

3. A process according to claim 1 wherein n is 1, 2 or 3.

4. A process according to claim 1 wherein n is 1 or 2, and X is substituted in the para position, meta position, or para and meta positions.

5. A process according to claim 3 or 4 wherein n is 1 or 2, and X is selected from the group consisting of nitro, cyano, alkylcarbonyl, trifluoromethyl, aldehyde, chloro, bromo and iodo.

6. A process according to claim 5 wherein X is chloro, bromo or iodo.

7. A process according to claim 6 wherein X is chloro.

8. A process according to claim 1 wherein said phosphate compound is tri-(p-chlorophenyl) phosphate.

9. A process according to claim 1 or 4 wherein said polyamide is polycaprolactam.

10. A process according to claim 1 wherein the amount of said aryl phosphate compound is at least about 0.05 weight percent based on the total weight of the mixture.

11. A process according to claim 9 wherein said amount is from about 0.1 to about 10 weight percent.

12. A process according to claim 10 wherein said amount is from about 0.2 to about 2 weight percent.

13. A process according to claim 10 wherein said amount is from about 0.1 to about 10 weight percent.

* * * * *

UNITED STATES PATENT AND TRADEMARK OFFICE
CERTIFICATE OF CORRECTION

PATENT NO. : 4,390,667

DATED : June 28, 1983

INVENTOR(S) : Shaul Moshe Aharoni and Theodore Largman

It is certified that error appears in the above-identified patent and that said Letters Patent is hereby corrected as shown below:

On the title page Inventors should read

--(75) Inventor: Theodore Largman --.

Signed and Sealed this

Thirteenth Day of September 1983

[SEAL]

Attest:

GERALD J. MOSSINGHOFF

Attesting Officer

Commissioner of Patents and Trademarks